United States Patent
Hatanaka et al.

(10) Patent No.: US 7,326,374 B2
(45) Date of Patent: Feb. 5, 2008

(54) POLARIZING PLATE, ADHESIVE FOR POLARIZING PLATE, OPTICAL FILM AND IMAGE DISPLAY DEVICE

(75) Inventors: Takezou Hatanaka, Ibaraki (JP); Shuuji Yano, Ibaraki (JP); Hiroe Maeda, Toyohashi (JP); Akihiro Nishida, Ibaraki (JP); Takashi Kondou, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 367 days.

(21) Appl. No.: 10/517,366

(22) PCT Filed: Jun. 9, 2003

(86) PCT No.: PCT/JP03/07244

§ 371 (c)(1),
(2), (4) Date: Dec. 10, 2004

(87) PCT Pub. No.: WO03/104862

PCT Pub. Date: Dec. 18, 2003

(65) Prior Publication Data

US 2006/0019100 A1 Jan. 26, 2006

(30) Foreign Application Priority Data

Jun. 11, 2002 (JP) .............................. 2002-169680

(51) Int. Cl.
*G02B 1/04* (2006.01)
*B32B 27/40* (2006.01)
*B29D 11/00* (2006.01)

(52) U.S. Cl. .................... 264/1.34; 359/490; 428/423.3
(58) Field of Classification Search ............. 428/423.1, 428/423.5, 473.5, 474.4, 423.3, 424.7, 425.3; 528/44; 359/490, 485; 264/1.34; 252/585
See application file for complete search history.

(56) References Cited

U.S. PATENT DOCUMENTS 6,654,085 B1 * 11/2003 Koike et al. ................. 349/112
6,797,383 B2 * 9/2004 Nishizawa et al. ......... 428/412
6,964,814 B2 * 11/2005 Fujii et al. ................ 428/423.1

FOREIGN PATENT DOCUMENTS

| EP | 1 160 591 | 12/2001 |
|---|---|---|
| JP | 2001-353747 | 12/2001 |
| JP | 2002-38119 | 2/2002 |
| WO | WO 01/37007 | 5/2001 |

* cited by examiner

*Primary Examiner*—Thao Tran
(74) *Attorney, Agent, or Firm*—Westerman, Hattori, Daniels & Adrian, LLP.

(57) ABSTRACT

A polarizing plate of the present invention comprising a polarizer and a protective film provided on at least one surface thereof with an adhesive layer, wherein the protective film comprises (A) a thermoplastic resin having a substituted and/or non-substituted imide group in a side chain and (B) a thermoplastic resin having a substituted and/or non-substituted phenyl group, and nitrile group in a side chain, and the adhesive layer comprises a polyurethane adhesive containing a urethane polyol and an isocyanate crosslinking agent. The polarizing plate exhibits good resistance moisture.

8 Claims, 1 Drawing Sheet

[FIG.1]
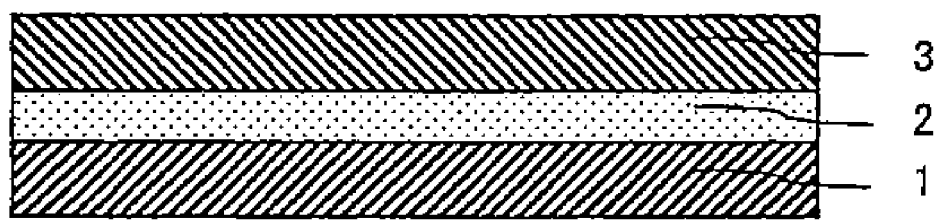
[FIG.2]
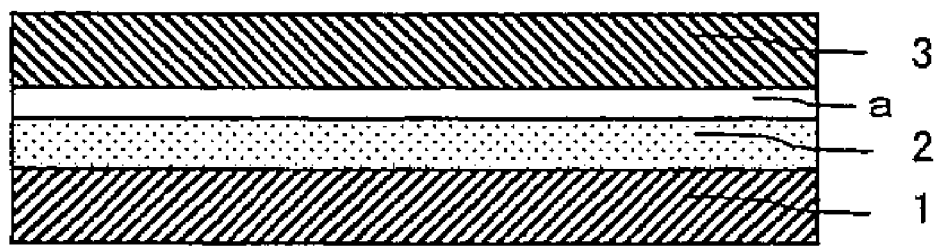

POLARIZING PLATE, ADHESIVE FOR POLARIZING PLATE, OPTICAL FILM AND IMAGE DISPLAY DEVICE

FIELD OF THE INVENTION

The present invention relates to a polarizing plate. Moreover, the present invention relates to a polarizing plate adhesive used in the polarizing plate. A polarizing plate of the present invention can form an image viewing display such as a liquid crystal display, an organic EL (Electro-Luminescent) display, a PDP (Plasma Display Panel) or the like, alone or as an optical film obtained by laminating the polarizing plate.

BACKGROUND ART

In a liquid crystal display or the like, it is indispensable to dispose polarizers on both sides of a glass substrate forming a liquid crystal panel surface because of an image forming scheme thereof and generally, there has been employed a polarizing plate obtained by adhering a protective films made of triacetyl cellulose or the like to a polarizer, which is containing a polyvinyl alcohol-based film and a dichroic material such as iodine or the like. Note that the polarizing plates each have been fabricated by adhering a protective film to a polarizer with an adhesive.

Conventionally, an aqueous adhesive has been preferably used as a polarizing plate adhesive used in adhesion of the protective film onto the polarizer and for example there has been used a polyvinyl alcohol-based adhesive obtained by mixing a melamine-based crosslinking agent or the like into a polyvinyl alcohol aqueous solution. A polyvinyl alcohol-based adhesive, however, has had problems associated with moisture resistance such as that a protective film is peeled off if a polarizing plate is immersed in warm water.

On the other hand, it is disclosed in JP-A No. 7-120617 that a urethane prepolymer is used as a polarizing plate adhesive. Though, with such an adhesive adopted, moisture resistance is improved to some extent, it is hard to sufficiently improve moisture resistance, despite improvement made as much as possible on the adhesive since a triacetyl cellulose film is high in moisture permeability. Moreover, it is disclosed in, for example, JP-A No. 5-212828 and JP-A No. 6-51117 that a thermoplastic saturated norbornen-based resin sheet is adopted as a protective film for the purpose to decrease moisture permeability of the protective film and to thereby improve moisture resistance. The norbornene-based resin sheet has, however, problems such as being fragile and being poor in solvent resistance (degraded by sebum), making its workability to be insufficient.

It is an object of the present invention to provide a polarizing plate good in moisture resistance. It is another object of the present invention to provide a polarizing plate adhesive used in the polarizing plate. It is still another object of the present invention to provide an optical film obtained by laminating polarizing plates and it is a further object of the present invention to provide an image viewing display such as a liquid crystal display.

DISCLOSURE OF THE INVENTION

The present inventors have conducted serious researches in order to solve the above tasks with the resulted finding that the objects can be achieved with a polarizing plate shown below, which has led to completion of the present invention.

That is, the present invention is related to a polarizing plate comprising a polarizer and a protective film provided on at least one surface thereof with an adhesive layer, wherein the protective film comprises (A) a thermoplastic resin having a substituted and/or non-substituted imide group in a side chain and (B) a thermoplastic resin having a substituted and/or non-substituted phenyl group, and nitrile group in a side chain, and the adhesive layer comprises a polyurethane adhesive containing a urethane polyol and an isocyanate crosslinking agent.

The polarizing plate of the present invention has a protective film on a polarizer comprising (A) a thermoplastic resin having a substituted and/or non-substituted imide group in a side chain and (B) a thermoplastic resin having a substituted and/or non-substituted phenyl group, and nitrile group in a side chain. The protective film comprising a mixture of the thermoplastic resins (A) and (B) as a main component is low in film strength, flexible and easily torn. The protective film Is excellent in solvent resistance. It is possible to attain a polarizing plate good In environmental durability and good in moisture resistance in conditions of a high temperature and a high humidity.

An adhesive layer between a polarizer and a protective film comprises a polyurethane adhesive containing a urethane polyol to be used as a main component and an isocyanate crosslinking agent to be used as a curing agent. Such a polyurethane adhesive is good in adherence between the protective film and the polarizer and also good in moisture resistance. The Urethane polyol in the polyurethane adhesive is preferably a polyether urethane polyol.

In the polarizing plate, it is preferable to apply at least one adhesion imparting treatment selected from the group consisting of a dry treatment, a chemical treatment and coating treatment to a surface of the protective film which adheres to the polarizer. With the at least one adhesive imparting treatment applied, more of improvement can be ensured on adherence between the protective film and the polarizer and moisture resistance of the laminate thereof.

In a protective film of the polarizing plate, if a direction along which an in-plane refractive index is maximized is X axis, a direction perpendicular to X axis is Y axis, a thickness direction of the film is Z axis; refractive indexes in the respective axis directions are nx, ny and nz; and a thickness of the transparent film is d (nm) by definition, it is preferable that the transparent film satisfies the following relations:

in-plane retardation $Re=(nx-ny) \times d \leq 20$ nm and
thickness direction retardation $Rth= \{(nx+ny)/2-nz\} \times d \leq 30$ nm.

An in-plane retardation of the protective film is preferably 20 nm or less and more preferably 10 nm or less, and thickness direction retardation is 30 am or less and more preferably 20 nm or less. The protective film in which retardations are controlled in such a way can reduce an influence thereof on a polarization state when a polarized light impinges. A thickness d of the protective film, which is not specifically limited, is generally 500 μm or less and preferably in the range of from 1 to 300 μm. It is especially preferable that the thickness is in the range of from 5 to 200 μm.

In the polarizing plate sheet, the protective film is preferably a biaxially stretched film. Though no specific limitation is imposed on a stretching means and a stretching magnification thereof, it is preferable to be stretched at an equal magnification in any of the MD direction and the TD direction. A stretching magnification is preferably in the range of from 0.5 to 3 times and more preferably in the range of from 1 to 2 times. Since a general plastic material reveals birefringence by stretching, it is necessary to use a plastic material in an unstretched state in order to maintain the polarization state. An unstretched film is, however, short in strength, causing difficulty in handling. A protective film of the present invention, which comprises a mixture of the thermoplastic resins (A) and (B) as a main component, can be obtained as a film excellent in strength since birefringence is hard to reveal by stretching.

The polarizing plate preferably has a performance that after a sample the polarizing plate cut in a square having a size of 30 mm×30 mm is immersed in warm water at 60° C. for 16 hr, a peeling-off percentage of the protective film from the polarizer is preferably 1% or less relative to a length of a side of the square polarizing plate. A polarizing plate of the present invention preferably has the peeling-off percentage of 1% or less and more preferably 0.5% or less from the viewpoint of moisture resistance.

The present invention is further related to a polarizing plate adhesive used in formation of an adhesive layer between the polarizer and the protective film in the polarizing plate, comprising a polyurethane adhesive containing a urethane polyol and an isocyanate crosslinking agent.

The present invention is further related to an optical film comprising at least one polarizing plate. The present invention is further related to an image viewing display comprising the polarizing plate or the optical film.

BRIEF DESCRIPTION OF THE DRAWINGS

FIG. 1 is an example of a polarizing plate of the present invention.

FIG. 2 is an example of a polarizing plate of the present invention.

BEST MODE FOR CARRYING OUT THE INVENTION

A polarizing plate of the present invention is, as shown in FIG. 1, of a structure in which a protective film 3 is provided on at least one surface of a polarizer I with an adhesive layer 2 made of a polyurethane adhesive. An adhesion-imparting layer (a), as shown in FIG. 2, can be formed on the protective film 3. The adhesion imparting layer (a) is formed on a surface of the protective film 3 adhering to the polarizer 1. While, in FIG. 1 or 2, the protective film 3 is provided only on one side of the polarizer 1, two protective films 3 may be provided on both sides of the polarizer 1.

A polarizer is not limited especially but various kinds of polarizer may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type orientation films, such as dehydrated polyvinyl alcohol and dehydrochlorinated polyvinyl chloride, etc. may be mentioned. In these, a polyvinyl alcohol type film on which dichromatic materials such as iodine is absorbed is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

A protective film comprising (A) a thermoplastic resin having a substituted and/or non-substituted imide group in a side chain, and (B) a thermoplastic resin having a substituted and/or non-substituted phenyl group, and nitrile group in a side chain, is used. Protective films comprising the thermoplastic resins (A) and (B) are described in, for example, WO 01/37007. In addition, the protective film may also comprise other resins, when it comprises thermoplastic resins (A) and (B) as principal components.

The thermoplastic resin (A) may have substituted and/or non-substituted imide group in a side chain, and a principal chain may be of arbitrary thermoplastic resins. The principal chain may be, for example, of a principal chain consisting only of carbon atoms, or otherwise atoms other than carbon atoms may also be inserted between carbon atoms. And it may also comprise atoms other than carbon atoms. The principal chain is preferably of hydrocarbons or of substitution products thereof. The principal chain may be, for example, obtained by an addition polymerization. Among concrete examples are polyolefins and polyvinyls. And the principal chain may also be obtained by a condensation polymerization. It may be obtained by, for example, ester bonds, amide bonds, etc. The principal chain is preferably of polyvinyl skeletons obtained by polymerization of substituted vinyl monomers.

As methods for introducing substituted and/or non-substituted imide group into the thermoplastic resin (A), well-known conventional and arbitrary methods may be employed. As examples for those methods, there may be mentioned a method in which monomers having the above-mentioned imide group are polymerized, a method in which the above-mentioned imide group is introduced after a principal chain is formed by polymerization of various monomers, and a method in which compounds having the above-mentioned imide group is grafted to a side chain. As substituents for imide group, well-known conventional substituents that can substitute a hydrogen atom of the imide group may be used. For example, alkyl groups, etc. may be mentioned as examples.

The thermoplastic resin (A) is preferably of two or more component copolymers including a repeating unit induced from at least one kind of olefin, and a repeating unit having at least one kind of substituted and/or non-substituted maleimide structure. The above-mentioned olefin-maleimide copolymers may be synthesized from olefins and maleimide compounds using well-known methods. The synthetic process is described in, for example, Japanese Patent Laid-Open Publication No. H5-59193, Japanese Patent Laid-Open Publication No. H5-195801, Japanese Patent Laid-Open Publication No. H6-136058, and Japanese Patent Laid-Open Publication No. H9-328523 official gazettes.

As olefins, for example, there may be mentioned, isobutene, 2-methyl-1-butene, 2-methyl-1-pentene, 2-methyl-1-hexene, 2-methyl-1-heptene, 1-iso octene, 2-methyl- 1-octene, 2-ethyl-1-pentene, 2-ethyl-2-butene, 2-methyl-2-pentene, and 2-methyl-2-hexene etc. Among them, isobutene is preferable. These olefins may be used independently and two or more kinds may be used in combination.

As maleimide compounds, there may be mentioned, maleimide, N-methyl maleimide, N-ethylmaleimide, N-n-propyl maleimide, N-i-propyl maleimide, N-n-butyl maleimide, N-s-butyl maleimide, N-t-butyl maleimide, N-n-pentyl maleimide, N-n-hexyl maleimide, N-n-heptyl maleimide, N-n-octyl maleimide, N-lauryl maleimide, N-stearyl maleimide, N-cyclo propyl maleimide, N-cyclobutyl maleimide, N-cyclopentyl maleimide, N-cyclohexyl maleimide, N-cycloheptyl maleimide, and N-cyclooctyl maleimide, etc. Among them N-methyl maleimide is preferable. These maleimide compounds may be used independently and two or more kinds may be used in combination.

A content of repeating units of olefin in the olefin-maleimide copolymer is not especially limited, and it is approximately 20 through 70 mole % in all of repeating units in the thermoplastic resin (A), preferably 40 through 60 mole %, and more preferably 45 through 55 mole %. A content of repeating units of maleimide structure is approximately 30 through 80 mole %, preferably 40 through 60 mole %, and more preferably 45 through 55 mole %.

The thermoplastic resin (A) may comprise repeating units of the above-mentioned olefin, and repeating units of maleimide structure, and it may be formed only of these units. And In addition to the above constitution, other vinyl based monomeric repeating units may be included at a percentage of 50 mole % or less. As other vinyl based monomers, there may be mentioned, acrylic acid based monomers, such as methyl acrylate and butyl acrylate; methacrylic acid based monomers, such as methyl methacrylate and cyclo hexyl methacrylate; vinyl ester monomers, such as vinyl acetate; vinyl ether monomers, such as methyl vinyl ether; acid anhydrides, such as maleic anhydride; styrene based monomers, such as styrene, α-methyl styrene, and p-methoxy styrene etc.

A weight average molecular weight of the thermoplastic resin (A) is not especially limited, and it is approximately $1\times10^3$ through $5\times10^6$. The above-mentioned weight average molecular weight is preferably $1\times10^4$ or more and $5\times10^5$ or more. A glass transition temperature of the thermoplastic resin (A) is 80° C. or more, preferably 100° C. or more, and more preferably 130° C. or more.

And glutar imide based thermoplastic resins may be used as the thermoplastic resin (A). Glutar imide based resins are described in Japanese Patent Laid-Open Publication No. H2-153904 etc. Glutar imide based resins have glutar imide structural units and methyl acrylate or methyl methacrylate structural units. The above-mentioned other vinyl based monomers may be introduced also into the glutar imide based resins.

The thermoplastic resin (B) is a thermoplastic resin having substituted and/or non-substituted phenyl group, and nitrile group in a side chain. As a principal chain of the thermoplastic resin (B), similar principal chains as of the thermoplastic resin (A) may be illustrated.

As a method of introducing the above-mentioned phenyl group into the thermoplastic resin (B), for example, there may be mentioned a method in which monomers having the above-mentioned phenyl group is polymerized, a method in which phenyl group is introduced after various monomers are polymerized to form a principal chain, and a method in which compounds having phenyl group are grafted into a side chain, etc. As substituents for phenyl group, well-known conventional substituents that can substitute a hydrogen atom of the phenyl group may be used. For example, alkyl groups, etc. may be mentioned as examples. As method for introducing nitrile groups into the thermoplastic resin (B), similar methods for introducing phenyl groups may be adopted.

The thermoplastic resin (B) is preferably of two or more components copolymers comprising repeating unit (nitrile unit) induced from unsaturated nitrile compounds, and repeating unit (styrene based unit) induced from styrene based compounds. For example, acrylonitrile styrene based copolymers may preferably be used.

As unsaturated nitrile compounds, arbitrary compounds having cyano groups and reactive double bonds may be mentioned. For example, acrylonitrile, α-substituted unsaturated nitrites, such as methacrylonitrile, nitrile compounds having has α- and β-disubstituted olefin based unsaturated bond, such as fumaronitrile may be mentioned.

As styrene based compound, arbitrary compounds having a phenyl group and a reactive double bond may be mentioned. For example, there may be mentioned, non-substituted or substituted styrene based compounds, such as styrene, vinyltoluene, methoxy styrene, and chloro styrene; α-substituted styrene based compounds, such as α-methyl styrene.

A content of a nitrile unit in the thermoplastic resin (B) is not especially limited, and it is approximately 10 through 70% by weight on the basis of all repeating units, preferably 20 through 60% by weight, and more preferably 20 through 50% by weight. It is further preferably 20 through 40% by weight, and still further preferably 20 through 30% by weight. A content of a styrene based unit is approximately 30 through 80% by weight, preferably 40 through 80% by weight, and more preferably 50 through 80% by weight. It is especially 60 through 80% by weight, and further preferably 70 through 80% by weight.

The thermoplastic resin (B) may comprise repeating units of the above-mentioned nitriles, and styrene based repeating units, and it may be formed only of these units. And in addition to the above constitution, other vinyl based monomeric repeating units may be included at a percentage of 50 mole % or less. As other vinyl based monomers, compounds, repeating units of olefins, repeating units of maleimide and substituted maleimides, etc. may be mentioned, which were illustrated in the case of thermoplastic resin (A). As the thermoplastic resins (B), AS resins, ABS resins, ASA resins, etc. may be mentioned.

A weight average molecular weight of the thermoplastic resin (B) is not especially limited, and it is approximately $1\times10^3$ through $5\times10^6$. It is preferably $1\times10^4$ or more, and $5\times10^5$ or less.

A compounding ratio of the thermoplastic resin (A) and the thermoplastic resin (B) is adjusted depending on a retardation required for a protective film. In the above-mentioned compounding ratio, in general, a content of the thermoplastic resin (A) is preferably 50 through 95% by weight in total amount of a resin in a film, more preferably 60 through 95% by weight, and still more preferably 65 through 90% by weight. A content of the thermoplastic resin (B) is preferably 5 through 50% by weight in total amount of the resin in the film, more preferably 5 through 40% by weight, and still more preferably 10 through 35% by weight. The thermoplastic resin (A) and the thermoplastic resin (B) are mixed using a method in which these are kneaded in thermally molten state.

A thickness of the protective film is generally 500 µm or less and preferably in the range of from 1 to 300 µm. The thickness is especially preferably in the range of from 5 to 200 µm.

The protective film comprising the thermoplastic resins (A) and (B) is provided at least on one side of the polarizer. In a case where protective films are provided on both surfaces of the polarizer, a protective film on the other side is not specifically limited on a material thereof, while both of the protective films on both sides preferably comprise the thermoplastic resins (A) and (B).

As a material conventionally used as the protective film, for example, polyester type polymers, such as polyethylene terephthalate and polyethylenenaphthalate; cellulose type polymers, such as diacetyl cellulose and triacetyl cellulose; acrylics type polymer, such as poly methylmethacrylate; styrene type polymers, such as polystyrene and acrylonitrile-styrene copolymer (AS resin); polycarbonate type polymer may be mentioned. Besides, as examples of the polymer forming a protective film, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; imide type polymers; sulfone type polymers; polyether sulfone type polymers; polyether-ether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers may be mentioned. In addition, a film comprising resins of heat curing type or ultraviolet curing type, such as acrylics type, urethane type, acrylics urethane type and epoxy type and silicone type may be mentioned.

As the opposite side of the polarizing-adhering surface above-mentioned protective film, a film with a hard coat layer and various processing aiming for antireflection, sticking prevention and diffusion or anti glare may be used.

A hard coat processing is applied for the purpose of protecting the surface of the polarizing plate from damage, and this hard coat film may be formed by a method in which, for example, a curable coated film with excellent hardness, slide property etc. is added on the surface of the protective film using suitable ultraviolet curable type resins, such as acrylic type and silicone type resins. Antireflection processing is applied for the purpose of antireflection of outdoor daylight on the surface of a polarizing plate and it may be prepared by forming an antireflection film according to the conventional method etc. Besides, a sticking prevention processing is applied for the purpose of adherence prevention with adjoining layer.

In addition, an anti glare processing is applied in order to prevent a disadvantage that outdoor daylight reflects on the surface of a polarizing plate to disturb visual recognition of transmitting light through the polarizing plate, and the processing may be applied, for example, by giving a fine concavo-convex structure to a surface of the protective film using, for example, a suitable method, such as rough surfacing treatment method by sandblasting or embossing and a method of combining transparent fine particle. As a fine particle combined in order to form a fine concavo-convex structure on the above-mentioned surface, transparent fine particles whose average particle size is 0.5 to 50 µm, for example, such as inorganic type fine particles that may have conductivity comprising silica, alumina, titania, zirconia, tin oxides, indium oxides, cadmium oxides, antimony oxides, etc., and organic type fine particles comprising cross-linked of non-cross-linked polymers may be used. When forming fine concavo-convex structure on the surface, the amount of fine particle used is usually about 2 to 50 weight parts to the transparent resin 100 weight parts that forms the fine concavo-convex structure on the surface, and preferably 5 to 25 weight parts. An anti glare layer may serve as a diffusion layer (viewing angle expanding function etc.) for diffusing transmitting light through the polarizing plate and expanding a viewing angle etc.

In addition, the above-mentioned antireflection layer, sticking prevention layer, diffusion layer, anti glare layer, etc. may be built in the protective film itself, and also they may be prepared as an optical layer different from the protective layer.

An adhesive layer between the polarizer and the protective film is formed with a polyurethane adhesive comprising a urethane polyol and an isocyanate crosslinking agent.

Urethane polyol, which is a main component, is obtained by reaction of a polymer polyol with a polyisocyanate compound. Urethane polyol is obtained in the reaction in a way such that a hydroxyl group of the polyol reacts with an isocyanate group of the polyisocyanate compound in excess of the hydroxyl group in equivalent ratio therebetween and has a hydroxyl group at an end thereof.

Examples of the urethane polyols include: a polyether type polyurethane polyol, a polyester type polyurethane polyol, and a polyacrylic type polyurethane polyol. Among urethane polols, preferable is polyether type polyurethane. Examples of polymer polyols of the urethane polyols include: a polyether polyol, a polyester polyol, a polyacrylic polyol and others. A number-average molecular weight of the urethane polyol is usually preferably on the order in the range of from 1000 to 30000.

Polyether polyol can be obtained by adding an alkylene oxide to one, or two or more kinds of polyvalent alcohols through ring opening polymerization. Examples of polyvalent alcohols include: ethylene glycol, diethylene glycol, propylene glycol, dipropylene glycol, glycerin, trimethylol propane and others, and examples of alkylene oxides include: ethylene oxide, propylene oxide, butylene oxide, styrene oxide, tetrahydrofran and other. The alkylene oxides can be used as a single kind alone or two or more kinds in copolymer.

Polyester polyol can be obtained in a reaction between a polybasic acid component and a polyol component in which a hydroxyl group of the polyol component reacts with a carboxyl group of the polybasic acid component in excess of the hydroxyl group in equivalent ratio therebetween. Used in general is linear chain polyester composed of a dibasic acid component and a diol component.

Examples of dibasic acid components include: aromatic dicarboxylic acids, such as orthophthalic acid, isophthalic acid, terephthalic acid and the like; alicyclic dicarboxylic acids, such as hexahydrophthalic acid, tetrahydrophthalic acid, 1,3-cyclohexanedicarboxylic acid, 1,4-cyclohexanedicarboxylic acid and the like; aliphatic dicarboxylic acids, such as oxalic acid, succinic acid, malonic acid, glutaric acid, adipic acid, pimelic acid, suberic acid, azelaic acid, sebacic acid, decanedicarboxylic acid, dodecanedicaroboxylic acid, octadecanedicarboxylic acid and the like; acid anhydrides of the dibasic acids; lower alcohol esters thereof; and others.

Examples of diols include: ethylene glycol, 1,2-propanediol, 1,3-propanediole, 1,3-butanediol, 1,4-butanediol, neopentyl glycol, pentanediol, 1,6-hexanediol, 1,8-octanediol, 1,10-decanediol, diethylene glycol, triethylene glycol, polyethylene glycol, dipropylene glycol, polypropylene glycol, 1,4-cyclohexanedimethanol, 1,4-cyclohexanediol, bisphenol A, bisphenol F, hydrogenated bisphenol A, hydrogeneted bisphenol F and others.

Production of a polyester polyol composed of the dibasic acid component and the diol component can be conducted according to a general production method for polyester polyol except for the reaction between the dibasic acid component and the diol component in a way such that a hydroxyl group of the diol component reacts with a carboxylic group of the dibasic acid component in excess of hydroxyl group of the diol component. The reaction between the dibasic acid component and the diol component is conducted in a way such that a carboxylic group of the dibasic acid component reacts with a hydroxyl group of the diol component in excess of the hydroxyl group in equivalent ratio therebetween. To be concrete, predetermined amounts of the dibasic acid component and the diol component are subjected to dehydration condensation in the presence or absence of a catalyst at a temperature of the order in the range of from 200 to 280° C. for a time of the order in the range of from 3 to 20 hr to thereby implement esterification. As catalysts, there can be used a general esterification catalyst and examples thereof include: dibutyltin oxide, zinc acetate, titaniumtetrabutoxide, antimony trioxide, and the like. As polyester polyols, exemplified are poly β-methyl-δ-valerolactone, polycaprolacton and the like.

Acrylic polyol is an acrylic copolymer having a hydroxyl group, obtained by copolymerization of a copolymerizable monomer having a hydroxyl group with (meth) acrylate as a main component. Examples of copolymerizable monomers each having a hydroxyl group include: hydroxyalkyl ester of acrylic acids or methacrylic acids, such as β-hydroxyethyl acrylate, β-hydroxypropyl acrylate, 3-hydroxypropyl acrylate, β-hydroxybutyl acrylate, 4-hydroxybutyl acrylate, β-hydroxypentyl acrylate and the like; acrylic acid monoesters or methacrylic acid monoesters of polyvalent alcohols, such as glycerin, trimethylolpropane and the like; N-methylolacrylamide; N-methylolmethacrylamide; and the like.

As polyisocyanate compounds, there can be used aromatic, aromatic-aliphatic, aliphatic or alicyclic polyisocyanate compounds, which have been usually used for polyurethane, without specifically limiting to any of the compounds. Typical examples thereof include: 1,5-naphthylene diisocyanate, 4,4'-diphenylmethane diisocyanate, 4,4'-diphenyldimethylmethane diisocyanate, tetraalkyldiphenylmethane diisocyanate, 1,3-phenylene diisocyanate, 1,4-phenylene diisocyanate, tolylene diisocyanate, butane-1,4-diisocyanate, hexamethylene diisocyanate, 2,2,4-trimethylhexamethylene diisocyanate, 2,4,4-trimethylhexamethylene diisocyanate, cyclohexane-1,4-diisocyanate, xylylene diisocyanate, isophorone diisocyanate, dicyclohexylmethane-4,4'-diisocyanate, 1,3-bis(isocyanate methyl)cyclohexane, methylcyclohexane diisocyanate, 4,4'-diphenyl ether diisocyanate, 4,4'-diphenylsulfoxide diisocyanate, 4,4'-diphenylsulfone diisocyanate, 4,4'-biphenyl dilsocyanate; derivatives of the compounds; and the like.

Preparation of urethane polyol as a main component can be realized in a general production method for polyurethane except for a reaction between polymer polyol and a polyisocyante compound in a way such that a hydroxyl group of the polymer polyol reacts with an isocyanate group of the polyisocyanate compound in excess of the hydroxyl group in equivalent ratio therebetween. A number-average molecular weight of the urethane polyol is usually preferably on the order in the range of from 5,000 to 100,000.

Urethane polyols can also contain a chain extender and a polymerization terminator as components. Examples of chain extenders include: diamines, such as ethylene diamine, propylene diamine, hexaethylene diamine, isophorone diamine, dicyclohexylmethane-4, 4'-diamine and the like; the above described low-molecular glycols; and others. As polymerization terminators, exemplified are alkyl monoamines such as di-n-butylamine, mono-n-butylamine and the like.

As isocyanate crosslinking agents, there can be used compounds each having at least two isocyanate groups. For example, the polyisocyanate compounds can be used as an ioscyanate crosslinking agent. To be detailed, examples thereof include: 2,4-tolylene diisocyanate, 2,6-tolylene diisocyanate, xylylene diisocyanate, 1,3-bisisocyanatomethylcyclohexane, hexamethylene diisocyanate, tetramethylxylylene diisocyanate, m-isopropenyl-α,α-dimethybenzyl isocyanate, methylenebis4-phenyl isocyanate, p-phenylene diisocyanate; dimers of the above described compounds; trimers thereof such as tris(6-isocyanate hexyl) isocyanurate; and a burette thereof and other compounds obtained by reacting the above described compounds with a polyvalent alcohol such as trimethylpropane or a polyvalent amine. As the isocyanate crosslinking agent, preferable is an aliphatic isocyanate in order to avoid yellowing of an adhesive layer. As the isocyanate crosslinking agent, preferable is a compound having a three or more isocyanate groups such as tris (6-isocyanate hexyl) isocyanurate.

Note that the isocyanate crosslinking agent described above can also have a terminal isocyanate group added with a protective group. As protective groups, there are available oxime, lactam and the like. A protected isocyanate group dissociates the protective group from the isocyanate group by heating to impart the isocyanate group reactivity.

The urethane polyol and the isocyanate crosslinking agent, when being used, as solid matter content, have proportions in the range of from 15 to 330 parts by weight for the isocyanate crosslinking agent and preferably in the range of from 30 to 100 parts by weight relative to 100 parts by weight of the urethane polyol. An isocyanate crosslinking agent in the range is good in both of adherence and moisture resistance.

A reactive catalyst may be employed in the polyurethane adhesive of the present invention in order to raise a reactivity of isocyanate group. While no specific limitation is placed on the reactive catalyst, preferable are a tin-based catalyst and an amine-based catalyst. Reactive catalysts can be used as a single kind alone or as combination of two or more kinds. An amount of usage of the reactive catalyst is usually 10 parts by weight or less relative to 100 parts by weight of the isocyanate crosslinking agent. If the usage amount of the reactive catalyst is more, a crosslinking reaction rate is accelerated to thereby cause foaming in an adhesive. A sufficient adherence cannot be attained with an adhesive after foaming therein. In a usual case where the reactive catalyst is adopted, content thereof is preferably in the range of 0.1 to 5 parts by weight and especially preferably in the range of 1 to 2 parts by weight.

As tin-based catalysts, though both of an inorganic type and an organic type can be used, preferable is of the organic type. Examples of inorganic tin-based catalysts include: stannous chloride, stannic chloride, and the like. An organic tin-based catalyst is preferably a catalyst having at least one selected from the organic groups, including aliphatic groups having skeletons, such as a methyl group, an ethyl group, an ether group, an ester group, and the like; an alicyclic group; and the like. Examples thereof include: tetra-n-butyltin, tri-n-butyltin acetate, n-butyltin trichloride, trimethyltin hydroxide, dimethylltin dichloride, dibutyltin dilaurate and the like.

No specific limitation is imposed on the amine-based catalyst. Preferable are, for example, amine-based compounds having at least one alicyclic group, as an organic group, such as quinolidine, amidine, diazabicycloundecene and the like. In addition, as the amine-based catalyst, exemplified are triethylamine and the like. As other reactive catalysts, there can be exemplified cobalt naphthenate, benzyltrimethylammonium hydroxide and the like.

As chemical agents that can be mixed into the polyurethane adhesive of the present invention, exemplified are coupling agents such as a silane coupling agent, a titanium coupling agent, and the like; various kinds of tackifiers, ultraviolet absorbent, antioxidants; stabilizers such as a heat resistance stabilizer, a hydrolysis resistance stabilizer and the like.

The polyurethane adhesive is usually used as a solution. Solutions or dispersions thereof may be of an organic solvent type; and of aqueous types, such as of an emulsion type, of a colloidal dispersion type and of an aqueous solution type. No specific limitation is imposed on an organic solvent and any solvent can be used as far as components of the adhesive are dissolved uniformly thereinto. Examples of organic solvents include: toluene, methyl ethyl ketone, ethyl acetate and the like. In the case of the aqueous type, the following materials can be mixed thereinto: for example, alcohols such as n-butyl alcohol, isopropyl alcohol and the like; ketones such as acetone and the like. In the case of the aqueous type, dispersions can be prepared according to ordinary methods, for example, using a dispersant and introducing a functional group low in reactivity with isocyanate group, such as a carboxylate, a sulfonate, a quaternary ammonium salt or the like, or a water-dispersible component such as polyethylene glycol or the like into a mixture of polyester type urethane or the isocyanate crosslinking agent.

A content of a solid matter in the polyurethane adhesive is generally in the range of from 10 to 50 wt %. If the content of the solid matter is lower than 10 wt %, there arises a tendency of insufficient adherence, while on the other hand, if the content is higher than 50 wt %, a viscosity of the adhesive is higher, leading to a tendency of an uneven thickness of a layer. The content of the solid matter is preferably in the range of from 20 to 40 wt %.

An adhesion imparting treatment can be applied on a surface of the protective film adhering to the polarizer. Examples of adhesion imparting treatments include: dry treatments, such as a plasma treatment and a corona treatment; chemical treatments, such as an alkaline treatment; coating treatment to form an adhesion imparting layer; and others. Among them, preferable is coating to form the adhesion imparting layer. The adhesion imparting layer can be formed by using various kinds of adhesion imparting agents, such as a polyester-based material, a polyurethane material, an acrylic-based material, and a polyethylene imine, a silane coupling agent or the like. Among them, preferably used is a urethane-modified polyester copolymer resin. Note that a thickness of an adhesion imparting layer is usually on the order in the range of from 0.01 to 10 μm, preferably on the order in the range of from 0.05 to 5 μm and especially preferably on the order in the range of from 0.1 to 1 μm.

A polarizing plate of the present invention is fabricated by laminating the protective film (on an adhesion impartation-treated surface) to the polarizer for adhesion with the polyurethane adhesive. A coating of the polyurethane adhesive may be conducted on either a protective film or a polarizer, or both. After adherence, the composite was subjected to a dry step to thereby form an adhesive layer, which is a dry coat layer. Adherence between the polarizer and the protective film can be achieved by application of a roll laminator or the like. Note that a heat drying temperature is preferably 80° C. or lower in consideration of heat resistance of the polarizer. A drying time is on the order in the range of from 24 to 72 hr, though no specific limitation is placed on a drying time. A thickness of an adhesive layer is usually on the order in the range of from 0.05 to 5 μm, though no specific limitation is placed on a thickness of an adhesive layer.

A polarizing plate of the present invention may be used in practical use as an optical film laminated with other optical layers. Although there is especially no limitation about the optical layers, one layer or two layers or more of optical layers, which may be used for formation of a liquid crystal display etc., such as a reflector, a transflective plate, a retardation plate (a half wavelength plate and a quarter wavelength plate included), and a viewing angle compensation film, may be used. Especially preferable polarizing plates are; a reflection type polarizing plate or a transflective type polarizing plate in which a reflector or a transflective reflector is further laminated onto a polarizing plate of the present invention; an elliptically polarizing plate or a circular polarizing plate in which a retardation plate is further laminated onto the polarizing plate; a wide viewing angle polarizing plate in which a viewing angle compensation film is further laminated onto the polarizing plate; or a polarizing plate in which a brightness enhancement film is further laminated onto the polarizing plate.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a transparent protective layer etc.

As an example of a reflection type polarizing plate, a plate may be mentioned on which, if required, a reflective layer is formed using a method of attaching a foil and vapor deposition film of reflective metals, such as aluminum, to one side of a matte treated protective film. Moreover, a different type of plate with a fine concavo-convex structure on the surface obtained by mixing fine particle into the above-mentioned protective film, on which a reflective layer of concavo-convex structure is prepared, may be mentioned. The reflective layer that has the above-mentioned fine concavo-convex structure diffuses incident light by random reflection to prevent directivity and glaring appearance, and has an advantage of controlling unevenness of light and darkness etc. Moreover, the protective film containing the fine particle has an advantage that unevenness of light and darkness may be controlled more effectively, as a result that an incident light and its reflected light that is transmitted through the film are diffused. A reflective layer with fine concavo-convex structure on the surface effected by a surface fine concavo-convex structure of a protective film may be formed by a method of attaching a metal to the surface of a transparent protective layer directly using, for example, suitable methods of a vacuum evaporation method, such as a vacuum deposition method, an ion plating method, and a sputtering method, and a plating method etc.

Instead of a method in which a reflection plate is directly given to the protective film of the above-mentioned polarizing plate, a reflection plate may also be used as a reflective sheet constituted by preparing a reflective layer on the suitable film for the transparent film. In addition, since a reflective layer is usually made of metal, it is desirable that the reflective side is covered with a protective film or a polarizing plate etc. when used, from a viewpoint of preventing deterioration in reflectance by oxidation, of maintaining an initial reflectance for a long period of time and of avoiding preparation of a protective layer separately etc.

In addition, a transfilective type polarizing plate may be obtained by preparing the above-mentioned reflective layer as a transflective type reflective layer, such as a half-mirror etc. that reflects and transmits light. A transfilective type polarizing plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate. That is, the transflective type polarizing plate is useful to obtain of a liquid crystal display of the type that saves energy of light sources, such as a back light, in a well-lighted atmosphere, and can be used with a built-in light source if needed in a comparatively dark atmosphere etc.

The above-mentioned polarizing plate may be used as elliptically polarizing plate or circularly polarizing plate on which the retardation plate is laminated. A description of the above-mentioned elliptically polarizing plate or circularly polarizing plate will be made in the following paragraph. These polarizing plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called λ/4 plate) is used. Usually, half-wavelength plate (also called λ/2 plate) is used, when changing the polarization direction of linearly polarized light.

Elliptically polarizing plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarizing plate in which three-dimensional refractive index is controlled may also preferably compensate (prevent) coloring produced when a screen of a liquid crystal display is viewed from an oblique direction. Circularly polarizing plate is effectively used, for example, when adjusting a color tone of a picture of a reflection type liquid crystal display that provides a colored picture, and it also has function of antireflection. For example, a retardation plate may be used that compensates coloring and viewing angle, etc. caused by birefringence of various wavelength plates or liquid crystal layers etc. Besides, optical characteristics, such as retardation, may be controlled using laminated layer with two or more sorts of retardation plates having suitable retardation value according to each purpose. As retardation plates, birefringence films formed by stretching films comprising suitable polymers, such as polycarbonates, norbornene type resins, polyvinyl alcohols, polystyrenes, poly methyl methacrylates, polypropylene; polyallylates and polyamides; oriented films comprising liquid crystal materials, such as liquid crystal polymer; and films on which an alignment layer of a liquid crystal material is supported may be mentioned. retardation plate may be a retardation plate that has a proper retardation according to the purposes of use, such as various kinds of wavelength plates and plates aiming at compensation of coloring by birefringence of a liquid crystal layer and of visual angle, etc., and may be a retardation plate in which two or more sorts of retardation plates is laminated so that optical properties, such as retardation, may be controlled.

The above-mentioned elliptically polarizing plate and an above-mentioned reflected type elliptically polarizing plate are laminated plate combining suitably a polarizing plate or a reflection type polarizing plate with a retardation plate. This type of elliptically polarizing plate etc. may be manufactured by combining a polarizing plate (reflected type) and a retardation plate, and by laminating them one by one separately in the manufacture process of a liquid crystal display. On the other hand, the polarizing plate in which lamination was beforehand carried out and was obtained as an optical film, such as an elliptically polarizing plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such a viewing angle compensation retardation plate, in addition, a film having birefringence property that is processed by uniaxial stretching or orthogonal bidirectional stretching and a bidriectionally stretched film as inclined orientation film etc. may be used. As inclined orientation film, for example, a film obtained using a method in which a heat shrinking film is adhered to a polymer film, and then the combined film is heated and stretched or shrunk under a condition of being influenced by a shrinking force, or a film that Is oriented in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarizing plate with which a polarizing plate and a brightness enhancement film are adhered together is usually used being prepared in a backside of a liquid crystal cell. A brightness enhancement film shows a characteristic that reflects linearly polarized light with a predetermined polarization axis, or circularly polarized light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and Increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, In this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy; an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing plate and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing plate may consist of multi-layered film of laminated layers of a polarizing plate and two of more of optical layers as the above-mentioned separated type polarizing plate. Therefore, a polarizing plate may be a reflection type elliptically polarizing plate or a semi-transmission type elliptically polarizing plate, etc. in which the above-mentioned reflection type polarizing plate or a transflective type polarizing plate is combined with above described retardation plate respectively.

Although an optical film with the above described optical layer laminated to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

In the polarizing plate mentioned above and the optical film in which at least one layer of the polarizing plate is laminated, an adhesive layer may also be prepared for adhesion with other members, such as a liquid crystal cell etc. As pressure sensitive adhesive that forms adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives may be preferably used, which is excellent in optical transparency, showing adhesion characteristics with moderate wettability, cohesiveness and adhesive property and has outstanding weather resistance, heat resistance, etc.

Moreover, an adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The adhesive layer may contain additives, for example, such as natural or synthetic resins, adhesive resins, glass fibers, glass beads, metal powder, fillers comprising other inorganic powder etc., pigments, colorants and antioxidants. Moreover, It may be an adhesive layer that contains fine particle and shows optical diffusion nature.

Proper method may be carried out to attach an adhesive layer to one side or both sides of the polarizing plate or the optical film. As an example, about 10 to 40 weight % of the pressure sensitive adhesive solution in which a base polymer or its composition is dissolved or dispersed, for example, toluene or ethyl acetate or a mixed solvent of these two solvents is prepared. A method in which this solution is directly applied on a polarizing plate top or an optical film top using suitable developing methods, such as flow method and coating method, or a method in which an adhesive layer is once formed on a separator, as mentioned above, and is then transferred on the polarizing plate or the optical film may be mentioned.

An adhesive layer may also be prepared on one side or both sides of the polarizing plate or the optical film as a layer in which pressure sensitive adhesives with different composition or different kind etc. are laminated together. Moreover, when adhesive layers are prepared on both sides, adhesive layers that have different compositions, different kinds or thickness, etc. may also be used on front side and backside of the polarizing plate or the optical film. Thickness of an adhesive layer may be suitably determined depending on a purpose of usage or adhesive strength, etc., and generally is 1 to 500 µm, preferably 5 to 200 µm, and more preferably 10 to 100 µm.

A temporary separator is attached to an exposed side of an adhesive layer to prevent contamination etc., until it is practically used. Thereby, it can be prevented that foreign matter contacts adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing property may be given to the above-mentioned each layer, such as the polarizer for the polarizing plate, the protective film and the optical film etc. and the adhesive layer, using a method of adding UV absorbents, such as salicylic acid ester type compounds, benzophenol type compounds, benzotriazol type compounds, cyano acrylate type compounds, and nickel complex salt type compounds.

The polarizing plate or the optical film of the present invention may be preferably used for manufacturing various equipment, such as liquid crystal display, etc. Assembling of a liquid crystal display may be carried out according to conventional methods. That is, a liquid crystal display is generally manufactured by suitably assembling several parts such as a liquid crystal cell, polarizing plates or optical films and, if necessity, lighting system, and by incorporating driving circuit. In the present invention, except that a polarizing plate or an optical film by the present invention is used, there is especially no limitation to use any conventional methods. Also any liquid crystal cell of arbitrary type, such as TN type, and STN type, π type may be used.

Suitable liquid crystal displays, such as liquid crystal display with which the above-mentioned polarizing plate or the optical film has been located at one side or both sides of the liquid crystal cell, and with which a backlight or a reflector is used for a lighting system may be manufactured. In this case, the polarizing plate or the optical film by the present invention may be installed in one side or both sides of the liquid crystal cell. When installing the polarizing plates or the optical films in both sides, they may be of the same type or of different type. Furthermore, in assembling a liquid crystal display, suitable parts, such as diffusion plate, anti-glare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic luminescence layer and a metal electrode are laminated on a transparent substrate in an order configuring an illuminant (organic electro luminescence illuminant). Here, an organic luminescence layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in a intermediate process is the same as a mechanism in common diodes, and, as is expected, there is a strong non-linear relationship between electric current and luminescence strength accompanied by rectification nature to applied voltage.

In an organic EL display, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent substrate and is transmitted through a transparent electrode and an organic luminescence layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarizing plate, while preparing the polarizing plate on the surface side of the transparent electrode.

Since the retardation plate and the polarizing plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarizing plate and the retardation plate is adjusted to $\pi/4$, the mirror surface of the metal electrode may be completely covered.

This means that only linearly polarized light component of the external light that enters as incident light into this organic EL display is transmitted with the work of polarizing plate. This linearly polarized light generally gives an elliptically polarized light by the retardation plate, and especially the retardation plate is a quarter wavelength plate, and moreover when the angle between the two polarization directions of the polarizing plate and the retardation plate is adjusted to $\pi/4$, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarizing plate, it cannot be transmitted through the polarizing plate. As the result, mirror surface of the metal electrode may be completely covered.

EXAMPLES

Description will be given of a construction and an effect of the present invention below with presented examples. Note that in the examples, "part" and "%" means "part by weight" and "wt %," respectively, unless otherwise specified.

Example 1

(Preparation of Transparent Film)

An alternating copolymer consisting of isobutene and N-methyl maleimide (N-methyl maleimide contents 50 mole %) 75 parts, and an acrylonitrile-styrene copolymer having content of 28% of acrylonitrile 25 parts were dissolved in methylene chloride to obtain a solution having 15% of solid content concentration. After this solution was poured on a polyethylene terephthalate film lay to cover a glass plate and was left at room temperature for 60 minutes, dried film was removed from the film concerned. The film obtained was dried for 10 minutes at 100° C., for 10 minutes at 140° C., and further for 30 minutes at 160° C. to obtain a transparent film having a thickness of 50 μm. The transparent film thus obtained showed 4 nm of in-plane retardation Re and 4 nm of thickness direction retardation Rth.

Note that an in-plane retardation Re and thickness direction retardation Rth were calculated using refractive indexes nx, ny and nz measured with an automatic birefringence measuring instrument (manufactured by Oji Scientific Instruments with a trade name of Automatic Birefringence Meter KOBRA21ADH).

(Preparation of Polarizer)

A polyvinyl alcohol film having a thickness of 80 μm was dyed in 0.3% iodine aqueous solution, thereafter the film is stretched in aqueous solution at a boric acid content of 4% and a potassium iodide content of 2% to a stretching magnification of 5 times and then, the stretched film was dried at 50° C. for 4 minutes to obtain a polarizer.

(Preparation of Adhesive)

Dissolved into water were 10 parts of polyether urethane (manufactured by Mitsui Takeda Chemicals Inc. with a trade name of Takelac XW-74-C154) and 3 parts of an isocyanate crosslinking agent (manufactured by Mitsui Takeda Chemicals Inc. with a trade name of Takenate WD-725) so as to prepare a solution with a solid mater content of 25%. The solution was used as an adhesive.

(Preparation of Polarizing Plate)

Urethane-modified polyester copolymer resin (manufactured by Toyobo Co., Ltd. with a trade name of Byron UR1400) was dissolved into a solution of methyl ethyl ketone/toluene=1/1 in vol. ratio to prepare a solution with a solid matter content of 10%. The solution was coated on one surface of the transparent film and the wet coat was dried in an oven at 120° C. for 1 minute to provide an adhesion imparting layer with a thickness of 1 μm. After the adhesive was coated on an adhesion impartation-treated surface of the transparent film having the adhesion imparting layer, the transparent films were adhered on both surface of the polarizer with an adhesion machine and then, the laminate was dried and cured in an oven at 40° C. for 72 hr to obtain a polarizing plate. A thickness of the adhesive layer was 0.1 μm.

Example 2

(Preparation of Adhesive)

Dissolved into water were 10 parts of polyether urethane (manufactured by Mitsui Takeda Chemicals Inc. with a trade name of Takelac XW-74-C154), 3 parts of an isocyanate crosslinking agent (manufactured by Mitsui Takeda Chemicals Inc. with a trade name of Takenate WD-725) and 0.01 part of a tin-based catalyst (manufactured by Tokyo Fine Chemical Co., Ltd. with a trade name of OL1) so as to prepare a solution with a solid mater content of 25%. The solution was used as an adhesive agent. A polarizing plate was fabricated in a similar manner to that in preparation of polarizing plate of Example 1 with the exception that the adhesive was used as an adhesive.

Example 3

(Preparation of Adhesive)

Dissolved into water were 10 parts of polyether urethane (manufactured by Mitsui Takeda Chemicals Inc. with a trade name of Takelac XW-74-C154), 3 parts of an isocyanate crosslinking agent (manufactured by Mitsui Takeda Chemicals Inc. with a trade name of Takenate WD-725) and 0.01 part of an amine-based catalyst so as to prepare a solution with a solid mater content of 25%. The solution was used as an adhesive agent. A polarizing plate was fabricated in a similar manner to that in preparation of polarizing plate of Example 1 with the exception that the adhesive was used as an adhesive.

Example 4

(Preparation of Transparent Film)

A glutar imide copolymer consisting of N-methyl glutar imide and methyl methacrylate (N-methyl glutar imide contents 75% and acid contents 0.01 milli equivalent/g or less, glass transition temperature 147° C.) 65 parts, and an acrylonitrile-styrene copolymer having content of 28% of acrylonitrile and 72% of styrene 35 parts were melt and mixed together to obtain a resin composition. The resin composition was fed to T dice type extruder to obtain a protective film having a thickness of 135 μm. The film was stretched 1.7 times at 160° C. in an MD direction, and, subsequently stretched 1.8 times at 160° C. in a TD direction. This biaxially stretched film showed a thickness of 55 μm, an in-plane retardation Re of 1 nm, and a thickness direction retardation Rth of 3 nm.

(Preparation of Polarizing Plate)

A polarizing plate was prepared in a similar manner to that in Example 1 with the exception that a biaxially stretched transparent film prepared as described above was used as a transparent film.

Comparative Example 1

Polyvinyl alcohol-based adhesive was coated on a triacetyl cellulose film, the films were adhered to both surfaces of the polarizer with an adhesion machine, and the laminate was dried and cured in an oven at 40° C. for 72 hr to prepare a polarizing plate. A thickness of an adhesive layer was 0.1 μm.

Comparative Example 2

A polyurethane adhesive was prepared in a similar manner to that in Example 1 with the exception that the isocyanate crosslinking agent in Example 1 was not used and a solid matter content was adjusted to 30%. A polarizing plate was prepared in a similar manner to that in Example 1 with the exception that the polyurethane adhesive was used.

Comparative Example 3

A polyurethane adhesive was prepared in a similar manner to that in Example 2 with the exception that the isocyanate crosslinking agent was not used and a solid matter content was adjusted to 30%. A polarizing plate was prepared in a similar manner to that in Example 1 with the exception that the polyurethane adhesive was used.

Comparative Example 4

A polyurethane adhesive was prepared in a similar manner to that In Example 3 with the exception that the isocyanate crosslinking agent was not used and a solid matter content was adjusted to 30%. A polarizing plate was prepared in a similar manner to that in Example 1 with the exception that the polyurethane adhesive was used.

The following evaluation was conducted on the polarizing plates obtained in the examples and the comparative examples. The results are shown in Table 1.

(Adherence)

State of the polarizing plate when the plate was extremely twisted to be eventually broken into two pieces was evaluated with the following standards. ○: polarizer and protective film are kept in single piece without peeling-off. Δ: Peeling-off between protective film and polarizer at edge is recognized. ×: Peeling-off between protective film and polarizer in inner is recognized.

(Moisture Resistance)

A sample having a size of 30 mm×30 mm cut off from the polarizing plate was immersed in warm water at 60° C. for 16 hr. Thereafter, a peeling-off from an edge of the sample was recognized to measure a peeling-off amount (mm). A percentage (%) of peeling-off was calculated relative to the length (30 mm) of a side of the sample.

TABLE 1

| | | adhesive | | | | | moisture resistance | |
| --- | --- | --- | --- | --- | --- | --- | --- | --- |
| | Protective film | main component | Crosslinking agent | catalyst | solid matter content (%) | adherence | peeling-off amount (mm) | percentage (%) |
| Example 1 | Thermoplastic resin (A), (B) | polyether polyurethane | isocyanate | — | 25 | ○ | 0.1 | 0.33 |
| Example 2 | Thermoplastic resin (A), (B) | polyether polyurethane | isocyanate | tin | 25 | ○ | 0.1 | 0.33 |
| Example 3 | Thermoplastic resin (A), (B) | polyether polyurethane | isocyanate | amine | 25 | ○ | 0.1 | 0.33 |

TABLE 1-continued

| | | adhesive | | | | moisture resistance | |
| --- | --- | --- | --- | --- | --- | --- | --- |
| | Protective film | main component | Crosslinking agent | catalyst | solid matter content (%) | adherence | peeling-off amount (mm) | percentage (%) |
| Example 4 | Thermoplastic resin (A), (B) | polyether polyurethane | isocyanate | — | 25 | ○ | 0.1 | 0.33 |
| Comparative example 1 | triacetyl cellulose | | polyvinyl alcohol | | | ○ | full peeling-off after 6 hr | 100 |
| Comparative example 2 | Thermoplastic resin (A), (B) | polyether polyurethane | — | — | 30 | x | full peeling-off after 1 hr | 100 |
| Comparative example 3 | Thermoplastic resin (A), (B) | polyether polyurethane | — | tin | 30 | x | full peeling-off after 1 hr | 100 |
| Comparative example 4 | Thermoplastic resin (A), (B) | polyether polyurethane | — | amine | 30 | x | full peeling-off after 1 hr | 100 |

It is found form Table 1 that a polarizing plate of the present invention is good in adherence. Moreover, it is also found that the polarizing plate is less in peeling-off and good in moisture resistance even under a condition of immersion in warm water.

INDUSTRIAL APPLICABILITY

A polarizing plate using a polarizing plate adhesive of the present invention can be used suitably in a liquid crystal display, an organic EL display, a PDP and the like alone as an optical film or as an optical film obtained by laminating the polarizing plates.

What is claimed is:

1. A polarizing plate comprising
   a polarizer, a protective film provided on at least one surface thereof with an adhesive layer, and an adhesion imparting layer on a surface of the protective film which adheres to the polarizer via the adhesive layer,
   wherein the protective film comprises (A) a thermoplastic resin having a substituted and/or non-substituted imide group in a side chain and (B) a thermoplastic resin having a substituted and/or non-substituted phenyl group, and nitrite group in a side chain,
   the adhesive layer comprises a polyurethane adhesive containing a urethane polyol and an isocyanate crosslinking agent, and
   wherein the adhesion imparting layer is formed from a urethane-modified polyester copolymer resin.

2. The polarizing plate according to claim 1, wherein the urethane polyol is a polyether urethane polyol.

3. The polarizing plate according to claim 1, wherein if in the protective film, a direction along which an in-plane refractive index is maximized is X axis, a direction perpendicular to X axis is Y axis, a thickness direction of the film is Z axis; refractive indexes in the respective axis directions are nx, fly and nz; and a thickness of the transparent film is d (nm) by definition, the transparent film satisfies the following relations:

$$\text{in-plane retardation } Re=(nx-ny)\times d \leq 20 \text{ nm and}$$
$$\text{thickness direction retardation } Rth = \{(nx+ny)/2 - nz\}\times d \leq 30 \text{ nm.}$$

4. The polarizing plate according to claim 1, wherein the protective film is a biaxially stretched film.

5. The polarizing plate according to claim 1, wherein after a sample of the polarizing plate cut in square having a size of 30 mm ×30 mm is immersed in warm water at 60° C. for 16 hr, a peeling-off percent of the protective film from the polarizer is 1% or less relative to a length of a side of the square polarizing plate.

6. An optical film comprising at least one polarizing plate according to claim 1.

7. An image viewing display comprising the optical film according to claim 6.

8. An image viewing display comprising the polarizing plate according to claim 1.

* * * * *